United States Patent
Cooley

(10) Patent No.: US 11,477,946 B2
(45) Date of Patent: Oct. 25, 2022

(54) PLANT-GROWING TRAY

(71) Applicant: INTERNATIONAL PLANT PROPAGATION TECHNOLOGY LTD, Skipton (GB)

(72) Inventor: John Cooley, Skipton (GB)

(73) Assignee: INTERNATIONAL PLANT PROPAGATION TECHNOLOGY LTD, Skipton (GB)

( * ) Notice: Subject to any disclaimer, the term of this patent is extended or adjusted under 35 U.S.C. 154(b) by 60 days.

(21) Appl. No.: 16/964,182

(22) PCT Filed: Jan. 22, 2019

(86) PCT No.: PCT/GB2019/050173
§ 371 (c)(1),
(2) Date: Jul. 22, 2020

(87) PCT Pub. No.: WO2019/145699
PCT Pub. Date: Aug. 1, 2019

(65) Prior Publication Data
US 2021/0029893 A1 Feb. 4, 2021

(30) Foreign Application Priority Data
Jan. 23, 2018 (GB) .................................... 1801097

(51) Int. Cl.
*A01G 9/02* (2018.01)

(52) U.S. Cl.
CPC ............ *A01G 9/027* (2013.01); *A01G 9/021* (2013.01)

(58) Field of Classification Search
CPC .......... A01G 9/0295; A01G 9/00; A01G 9/02; A01G 9/027; A01G 9/028; A01G 9/029; A01G 9/0296; A01G 9/021
See application file for complete search history.

(56) References Cited

U.S. PATENT DOCUMENTS

2012/0005955 A1   1/2012   Visser
2017/0064915 A1   3/2017   Steelandt

FOREIGN PATENT DOCUMENTS

EP   1459620 A2   9/2004
FR   1252090 A  *  1/1961 ............. A01G 9/029
(Continued)

OTHER PUBLICATIONS

GB Search Report dated Aug. 12, 2018.
International Search Report and Written Opinion dated Apr. 15, 2019.

*Primary Examiner* — Kristen C Hayes
(74) *Attorney, Agent, or Firm* — Thomas | Horstemeyer, LLP

(57) ABSTRACT

A plant-growing tray (102) comprises an array of cells (108) for containing stabilised media for propagating plants. The tray comprises a tray top (110), and each cell comprises a base (116) and an inclined side wall (114) extending from the base to the tray top. Each cell is configured to receive a stabilised medium, and comprises a plurality of projections (123), positioned around the side wall and facing into the cell, and a plurality of openings (125) defined in the side wall below the projections. The projections (123) are configured in use to support an upper portion of the stabilised medium. In a further aspect, a plant-growing tray for containing stabilised media for propagating plants is configurable in a nesting configuration with a similar tray, and comprises: a tray base configured to support a base portion of a stabilised medium; a support member, configured to support an upper portion of the stabilised medium; and an inclined tray wall connecting the support member to the tray base.

21 Claims, 9 Drawing Sheets

(56) References Cited

FOREIGN PATENT DOCUMENTS

| | | | |
|---|---|---|---|
| JP | 09154408 A | 6/1997 | |
| JP | H1175565 A | 3/1999 | |
| JP | 2005080619 A | 3/2005 | |
| JP | 2018068127 A | 10/2018 | |
| WO | WO-9319583 A1 * | 10/1993 | ........... A01G 9/0295 |
| WO | WO-2006016100 A1 * | 2/2006 | ............. A01G 9/021 |
| WO | WO-2010052472 A1 * | 5/2010 | ........... A01G 9/0295 |
| WO | 2010103276 A1 | 9/2020 | |

* cited by examiner

PLANT-GROWING TRAY

The invention relates to a plant-growing tray, or frame, and in particular to a plant-growing tray for containing stabilised media for propagating plants.

BACKGROUND

In commercial plant-propagation systems, plants may be grown, or propagated, with their roots in any of a number of conventional growing media, such as soil, peat or coir. For convenience in this document growing media of all kinds will be referred to by the generic term "compost".

When large numbers of plants are to be propagated, they may be arranged in trays, each tray being capable of holding a plurality of plants, such as typically between 20 and 800 plants. In some cases, the trays are handled by hand and in some cases they are handled by automated machinery. In use, the trays are typically arranged on the ground or on benching or tables.

Plant trays of this type are sometimes termed plant frames. The word tray will be used to include both terms in this document.

A tray typically comprises an array of cup-shaped cells, each cell being capable of containing compost for propagation of a plant. Traditionally, cells are filled with loose compost and plant seeds or cuttings. During growth, the plants in the cell develop a system of roots which holds together the compost in a "rootball" or "plug". Well-developed rootballs can be removed from cells all together as a single unit of compost and plant roots, but this only works when enough roots have developed to hold the compost together.

It is desirable to be able to remove rootballs from cells before the roots have fully developed, and also to remove the contents of cells that have not successfully grown a plant. However, this is not possible with loose-filled compost, which is a problem in the industry. A particularly popular way of overcoming this problem is to use stabilised media. Stabilised media for plant propagation typically comprise compost contained within some form of material which holds the compost together while the roots of the plant develop, or compost mixed with a binder which holds the compost together. A variety of types of stabilised media are available, including polymer glues which hold the compost together, and Jiffy® plugs which contain the root ball in a mesh material.

A particularly popular form of stabilised media is cylindrical, or tubular, stabilised media, such as an Ellepot®, in which a volume of compost is held in a (typically cylindrical) membrane of a permeable material, such as paper. The membrane is designed to retain the compost until the plant's root structure is sufficiently developed to retain the compost itself. Cylindrical stabilised media such as Ellepots® may be made on site as a continuous extruded tube of soil, which is wrapped in a membrane and cut into individual cylindrical "plugs" of an appropriate length. Cylindrical stabilised media are therefore naturally parallel sided. Each cylindrical plug may be placed upright in the cell of a plant tray ready for plant propagation.

In order to propagate plants in which the development of a good root system is important, it is desirable to be able to propagate plants from cylindrical stabilised media in trays which allow "air pruning" of the developing plant roots. Air pruning occurs by providing apertures or openings in the walls of plant containers, through which roots protrude but are stunted in growth (i.e. pruned) by air. Air pruning thus reduces root circling and promotes a healthy root system.

In order to allow propagation of plants in cylindrical stabilised media, some prior art trays have provided cells in which a plurality of ribs extend up the cell walls. The inner ends of the ribs contact the cylindrical stabilised medium and support it in an upright central position, while allowing airflow past the sides of the cylindrical stabilised medium to promote air pruning. In some such trays the sides of the cells, and the ribs themselves, are arranged to be vertical, or nearly vertical, so that the ribs contact the cylindrical stabilised medium along its upright sides to retain it in position. While such trays are effective, they require a lot of (typically plastic) material, and the vertical ribs and cell walls also prevent the trays from "nesting" (sitting one inside another) in one another for storage and transport. These trays are thus designed to stand, or stack, one on top of another, and they occupy a lot of space during storage and transport.

Most trays currently used to hold stabilised media are thermoformed plastic trays, which are naturally tapered, and so are able to nest in one another.

In order to reduce the spacial requirements of trays during storage and transport, plant-growing trays have been developed which are capable of nesting one inside the other for storage and transport. In order to allow nesting, the side walls of the tray's cells must be tapered so that they are wider at the top than the bottom.

While the bottom of the tapered cells may hold the base of the stabilised media in position, these tapered cells have the problem that stabilised media, in particular cylindrical stabilised media, inserted into the cells are prone to tip over rather than standing upright in a repeatable, central position in the cell. This is problematic for a number of automated processes involved in plant propagation, as the stabilised media are not positioned uniformly within the cells of the tray. This is also undesirable for the growth of the plant in the stabilised medium, as the plant may grow out of the stabilised medium at an angle, and the airflow round the stabilised medium may be uneven.

SUMMARY OF INVENTION

The invention provides a plant tray as defined in the appended independent claim, to which reference should now be made. Preferred or advantageous features of the invention are set out in dependent sub-claims.

In a first aspect, the invention provides a plant-growing tray for containing stabilised media for propagating plants, the tray comprising a tray base, configured to support a base portion of a stabilised medium, a support member, configured to support an upper portion of the stabilised medium, and an inclined tray wall connecting the support member to the tray base. The tray is advantageously configurable in a nesting configuration with a similar tray.

The plant-growing tray may be termed a nestable plant-growing tray, or a nesting plant-growing tray.

By providing a support member which is configured to support an upper portion of the stabilised medium, the present invention may advantageously provide a nesting tray which is capable of supporting a stabilised medium in a predetermined upright position in the tray.

The inclined tray wall may advantageously allow the tray to "nest" within a similar tray. This may improve the spacial efficiency of the trays for storage and transport.

The tray may comprise a plurality of cells, in which each cell is configured to receive a stabilised medium. In such a configuration, the inclined tray wall may be an inclined cell side wall. The inclined cell side wall may surround all, or a portion of, a cell.

The tray may comprise one or more openings defined in the tray wall between the support member and the tray base.

The support member may take the form of a projection arranged on the tray wall and facing towards the stabilised medium, in use. Alternatively, the support member may be a portion of the side wall, for example an edge of the side wall, which is configured to contact and support an upper portion of the stabilised medium, in use.

The tray may advantageously comprise a plurality of support members. Preferably, the tray comprises a plurality of support members configured to support each stabilised medium received in the tray.

If the support member projects from the tray wall towards the stabilised medium, the opening in the tray wall may advantageously allow the trays to adopt a nesting orientation in which the projecting support members pass through, or nest in, the corresponding openings defined in the cell side walls of the similar tray. Thus, the openings may enable the tray to nest, even if the support members project from the tray wall.

In a first particularly preferred embodiment of the invention, the tray comprises an array of cells for containing stabilised media for propagating plants. The tray comprises a tray top, and each cell comprises a base and an inclined side wall extending from the base to the tray top. Each cell is configured to receive a stabilised medium and comprises a plurality of projections, positioned around the side wall and facing into the cell, the projections being configured in use to support an upper portion of the stabilised medium. Each cell also comprises a plurality of openings defined in the side wall below the projections.

This first preferred embodiment is discussed further as the second aspect of the invention, below. All of the features discussed in relation to the second aspect of the invention may be equally applicable to the plant-growing tray according to the first aspect, and vice versa.

In a second aspect, the invention provides a plant-growing tray comprising an array of cells for containing stabilised media for propagating plants. The tray comprises a tray top, and each cell comprises a base and an inclined side wall extending from the base to the tray top. Each cell is configured to receive a stabilised medium and comprises a plurality of projections, positioned around the side wall and facing into the cell, the projections being configured in use to support an upper portion of the stabilised medium. Each cell also comprises a plurality of openings defined in the side wall below the projections.

The tray may advantageously be configurable in a nesting configuration with a similar tray. The plant-growing tray may thus be termed a nestable plant-growing tray, or a nesting plant-growing tray.

The projections may advantageously contact and support an upper portion of the stabilised medium once it has been inserted into the tray. This may retain the stabilised medium in its intended position, and prevent the stabilised medium from overbalancing and moving out of its intended upright position in the cell. This may be particularly useful when the tray is usable in automated, or mechanised, processes, for which it is important that machines can locate stabilised media in their intended positions in the cells.

The projections are preferably configured to support the stabilised medium in an upright position in the centre of the cell.

The tray is preferably intended for use with stabilised media that are less than or equal to the height of the cell, but stabilised media that are longer than the height of the cell may also be used.

Preferably, when a stabilised medium is located in a cell, it should not protrude beyond the cell top. This may advantageously allow trays containing stabilised media to be stacked one on top of another, without damaging the stabilised media.

The upper portion of the stabilised medium may be defined as a portion of the stabilised medium that is positioned, in use, more than half way up the cell.

The projections are preferably configured to contact the stabilised medium, in use, at a position in the upper half of the cell. The projections may be configured so that they contact the stabilised medium in use more than half way up the cell, that is, at a point that is closer to the tray top than the cell base.

The cells advantageously provide contact points for the stabilised media at their bases, where the stabilised media may rest on the cell base, and also at a vertically displaced projection located more than half way up the cell. This may beneficially provide increased support for the stabilised media throughout its lifetime in the tray.

By supporting an upper portion of the stabilised medium, the projections may thus allow the stabilised medium to be retained in an upright position in a cell with inclined side walls.

The cells may alternatively be termed tapered cells, due to their inclined, or non-vertical, side walls. The cells are wider at the tray top than they are at the base. The cells may preferably have a circular, or square, cross-section.

Particularly advantageously, the inclined side wall, and the openings below the projections, may allow the tray to be nested with one or more similar trays. By nested, or nesting, it is meant that two or more similar trays are arranged one above another, so that the cells of an upper tray are received within the cells of the tray beneath, and so on. Such nested configurations allow multiple trays to be stored and/or transported in a space-efficient manner.

Preferably each of the projections is arranged above an opening in the side wall, such that the tray may be nested with a similar tray, in which the tray is configurable in a nesting orientation in which the projections pass through, or nest in, the corresponding openings defined in the cells of the similar tray.

Arrangement of the projections above the openings in the side wall, that is between the tray top and the openings, advantageously allows the tray to "nest" with another similar tray. When one tray is placed within another similar tray, instead of the projections abutting the similar tray and preventing nesting, the positioning of the openings below the projections may advantageously allow trays to be nested one within another.

Preferably the tray comprises a skirt around its perimeter. The skirt may form a nesting abutment which abuts the tray top of a similar tray when the tray is in a nesting orientation.

The use of the skirt as a nesting abutment may advantageously mean that the height of the skirt defines a minimum separation between adjacent trays when a plurality of trays are nested together. This may ensure that the cells of adjacent trays are not forced together too closely. This may prevent trays from jamming together, and may prevent excessive loads being placed on thin portions of the cell walls. The skirt may also ensure that multiple trays are nested at a predetermined nesting height, which is useful for mechanisation of tray-handling processes.

The skirt preferably extends downwards from the tray top. The skirt is preferably arranged around at least a portion of the tray perimeter.

The height of the skirt is preferably less than the height of the cells, in order to allow cells of adjacent trays to nest within one another in a nesting orientation.

Each of the projections is preferably evenly spaced around the circumference of the cell. This may advantageously allow the projections to evenly support the stabilised medium, to retain it in position, preferably centrally within the cell.

Preferably each cell comprises 3, or 4, or 5, or 6, or 8, projections which are configured in use to support an upper portion of the stabilised medium.

A cell base diameter, or cell base dimension, may be defined where the cell base meets the side wall, the cell base diameter preferably being configured to receive a lower portion of the stabilised medium. The cell base diameter may be chosen to be approximately equal to the diameter of the lower portion of the stabilised medium.

It should be understood that the word diameter used herein refers to the lateral distance across a defined item. The cells described herein may have a variety of transverse cross sections, for example have a circular or square cross-section. Thus, the word diameter used herein may refer to a lateral dimension of a square cell, and should not be considered to be limited to circular or cylindrical cells or stabilised media.

The projections preferably define an upper cell diameter, configured to receive an upper portion of the stabilised medium. The upper cell diameter is measured from the innermost surfaces of opposing projections, and may therefore indicate the maximum diameter, or the maximum lateral dimension, of a stabilised medium to be received between the projections.

The extent to which the projections protrude from the side wall is preferably chosen to define an upper cell diameter that corresponds to a preferred diameter of stabilised media. The upper cell diameter is preferably approximately equal to the outer diameter of a stabilised medium to be received in the cell.

The upper cell diameter may be approximately equal to the cell base diameter. This may advantageously allow no, or very little, lateral movement of the stabilised media in the cells.

The projections may be configured so that the upper cell diameter is up to 2%, or 5%, or 8%, or 10% larger than the cell base diameter, or the diameter of stabilised media which the cell is intended to receive. This may allow stabilised media to be inserted to the cell more easily, while still retaining the stabilised media securely in a controlled position in the cell.

The cell base diameter may be chosen to correspond to a preferred diameter of stabilised media.

The side wall of the cell may define a side wall diameter where the side wall meets the tray top.

As the projections protrude inwards from the side wall, the upper cell diameter is naturally smaller than the side wall diameter. The upper cell diameter is preferably greater than or equal to 4 mm, or 8 mm, or 12 mm, or 15 mm, or 20 mm, or 25 mm, or 30 mm, or 35 mm, or 40 mm less than the side wall diameter. This separation may advantageously allow airflow between the cell side wall and the sides of the cylindrical stabilised media, and so may promote desirable air pruning of the plants in the stabilised media. This separation may also ensure that the stabilised media are supported in the centre of the cell away from the side walls, which may simplify mechanised insertion and/or removal of the stabilised media from the cells.

Preferably each of the projections comprises a rounded upper surface, or a curved upper surface. This may advantageously allow cylindrical stabilised media to be inserted to the cells even if they are not perfectly lined up with the central axis of the cells, as the stabilised media will be guided by the curved surface to their intended position. The rounded surface may also prevent damage to the stabilised media when they are inserted into or withdrawn from the cells.

In a preferred embodiment, the projections may be termed first projections, and the tray additionally comprises a plurality of optional second projections, positioned around the side wall between the openings and facing into the cell, configured in use to support a lower portion of the stabilised medium. The use of second projections in addition to the first projections may advantageously hold the stabilised media more securely in the cells.

The use of second projections is optional, as the base and side wall of the cell may be configured to hold the lower portion of the stabilised medium without second projections.

Preferably each of the first projections is evenly spaced around the circumference of the cell, and/or each of the second projections is evenly spaced around the circumference of the cell.

Preferably the first projections are radially offset relative to the second projections by 22.5°, or 30°, or 36°, or 45°, or 60°.

The radially offset position of the first and second projections advantageously allows the openings to be defined in the side wall below the first, upper, projections, so that the trays can adopt a nesting configuration.

Each cell may comprise 3, or 4, or 5, or 6, or 8, first projections, and 3, or 4, or 5, or 6, or 8, second projections.

The number of first projections may be different from the number of second projections.

In a preferred embodiment, the number of first projections is the same as the number of second projections.

The first projections may define an upper cell diameter configured to receive an upper portion of the stabilised medium, and the second projections may define a lower cell diameter, configured to receive a lower portion of the stabilised medium. Thus, the stabilised medium may advantageously be supported at two points along its length, so that the stabilised medium is retained in an upright position, and does not tip over during movement of the tray. This may be particularly beneficial for automated processing of the tray and the cylindrical stabilised media, as the position of the stabilised media is reliably known.

Preferably the upper cell diameter is approximately equal to the lower cell diameter. This may advantageously allow no, or very little, lateral movement of the cylindrical stabilised media in the cells.

Preferably the upper cell diameter is 2%, or 5%, or 8%, or 10% larger than the lower cell diameter. This may advantageously allow the stabilised medium to be supported securely in position, while making insertion of the stabilised medium into the cell, and its removal from the cell, easier.

The second projections may be configured so that the lower cell diameter is or 2%, or 5%, or 8%, or 10% larger than the diameter of stabilised media which the cell is intended to receive. This may allow stabilised media to be inserted to the cell more easily, while still retaining the stabilised media securely in a controlled position in the cell.

Alternatively, the second projections may be configured so that the lower cell diameter is 2%, or 5%, or 8%, or 10% smaller than the cell base diameter, or the diameter of stabilised media which the cell is intended to receive. This may allow stabilised media to be squeezed by the second projections, in order to retain the stabilised media securely in a controlled position in the cell.

The tray may optionally be configured to be stacked or nested with a similar tray, which can be stacked or nested with a similar tray. Preferably the tray comprises a stacking apparatus which comprises a stacking abutment spaced beneath an upper surface of the tray, and a corresponding opening defined in the upper surface of the tray above the stacking abutment, such that in a stacking orientation of the tray the stacking abutment seats on a seat portion of the similar tray, and in a nesting orientation of the tray the stacking abutment passes through, or nests in, the corresponding opening defined in the upper surface of the similar tray.

The tray may thus provide the advantage that cells in the similar tray may be filled with a cylindrical stabilised medium, before the tray is stacked on top of the similar tray. When the trays are stacked, the cylindrical stabilised medium in the similar tray is not significantly disturbed.

Preferably the tray comprises an upper surface which is substantially parallel to the upper surface of the similar tray both when the tray and the similar tray are nested and when they are stacked, and the tray is rotatable and/or translatable between the nesting and stacking orientations.

Advantageously, the tray may be rotatable, or translatable, or movable through some combination of rotation and translation, between the nesting and stacking orientations. In a preferred embodiment, however, the tray is rotated through a pre-determined angle between the nesting and stacking orientations.

The angle of rotation may depend on the shape of the tray and the shape of the array of cells.

For example, it is preferable that the tray, both when nested and stacked, is positioned directly, or vertically, above the similar tray and is not laterally offset from the similar tray. Consequently, if the tray is substantially rectangular (in plan view) then the nesting orientation and the stacking orientation are preferably separated by a rotation of 180°. If the tray is substantially square, then the nesting and stacking orientations may be separated by 90° or 180°.

It is not essential for the tray to be positioned directly above the similar tray in both the nesting and stacking orientations. However, in the nesting orientation the packing efficiency of a plurality of nested trays is optimised if the trays are not offset from one another. In the stacking orientation, if a large number of trays is stacked, then the stability of the stack may be optimised if the trays are not laterally offset from one another.

The base of each cell may advantageously comprise a base hole. This may advantageously allow stabilised media to be ejected from the cells by pushing them upwards, either by inserting a finger, or an automated ejecting member, upwards through the base hole. The base hole(s) may also allow airflow to reach the stabilised medium for air pruning. The base hole may also improve drainage and aeration of the compost in the stabilised medium.

Preferably the base hole is a central base hole. The cell may comprise a plurality of base holes.

The base of each cell may advantageously comprise a raised portion projecting upwardly from the base, the raised portion being configured to support a base of the stabilised media. This may advantageously support the stabilised media off the ground, in use, so that roots growing out of the base of the stabilised media are air pruned, and do not grow into the ground. The raised portion of the base may advantageously reduce the contact area between the cell base and the stabilised medium, and may additionally isolate stabilised media from possible disease or contamination from the ground beneath the tray.

The base hole is preferably provided in a raised portion projecting upwardly from the base, so that roots protruding out of the base hole are raised off the ground.

In a preferred embodiment, the base of the cell is configured to contact 5-35%, or 5-25%, of the surface area of the base of the stabilised medium, in use. The base of the stabilised medium is preferably a flat bottom surface of the stabilised medium. Where the stabilised medium is open-ended, for example a cylindrical Ellepot® , in which only the axial sides of the Ellepot are surrounded by stabilising membrane, compost may be prone to falling out of the stabilised medium. This contact area with the cell base may advantageously be great enough to provide support to the compost in the stabilised medium, while still leaving enough of the base of the stabilised medium open to the air, so that good aeration means that air pruning is encouraged.

In order not to deflect roots undesirably across the cell base, the cell base may comprise a plurality of ridges configured to contact the base of the stabilised medium. The plurality of ridges are preferably configured to contact 5-35% of the surface area of the base of the stabilised medium.

Preferably the base of the cell may be configured to contact 10-35%, or 15-25%, or 10-25%, or particularly preferably around 20% of the surface area of the base of the stabilised medium.

Preferably the base of each cell is configured so that 15-70% of the cell base projected area is in contact with the ground (or with any supporting surface on which the tray is sitting), in use. The cell base projected area is the cell "footprint" calculated based on the radius of the cell at its base.

The cell base is preferably shaped so that the cell base is only in contact with the ground over part of its outer surface as, for example, base holes may be present for various reasons.

Preferably the base of each cell is configured so that 15-70% of the cell base projected area is in contact with the ground, in use, in order to support the weight of the tray when it is filled with stabilised media, plants and water, without sinking into the ground, or placing too great a strain on the weight-bearing portions of the base. Particularly preferably the base of each cell may be configured so that 18-60%, or 20-50%, or 22-30% of the cell base projected area is in contact with the ground.

In a preferred embodiment, the cells are configured so that 20% of the cell base projected area is in contact with any flat surface upon which the tray is placed. This may advantageously allow the weight of the full tray to be spread over the contact area, in use, so that the tray does not sink into the ground.

The tray may comprise an array of any number of cells. The tray may preferably comprise an array of 6 cells, or 8, 15, 18, 32, 72, 98, 128, 126, 162, or 200 cells.

Preferably the tray is formed from injection-moulded plastic. Injection-moulded plastic may advantageously provide a tray that is stronger, and more rigid, than thermo-formed plastic trays. This may allow injection-mouded trays to support the weight of the tray when the cells are loaded with compost, plants and water.

In a particularly preferred embodiment, the cells are each configured to receive a parallel-sided stabilised medium, preferably a cylindrical stabilised medium. An example of a suitable cylindrical stabilised medium is an Ellepot® as described above. Suitable cylindrical stabilised media may preferably have a circular, or square, cross-section.

Preferably the openings in the cells extend to a lower end of the (first) projections, and preferably the (first) projections comprise a tapered or hollow underside configured to receive the projection of a similar tray when the trays are in a nesting orientation. This may advantageously allow adjacent trays to be nested more closely, as the projections of a tray below may nest below, and inside, the tapered or hollow underside of the projections above.

If the underside of the projection is hollow, the opening effectively extends upwards behind the projection, with the projection protruding inwards and covering a portion of the opening. This configuration may advantageously allow the projection of a similar tray to nest up inside the hollow underside of the projection, to allow closer nesting, while still providing a projection at the desired height.

Preferably the (first) projections comprise flared outer edges, so that the undersides of the (first) projections are configured to receive the projection of a similar tray when the trays are in a nesting orientation.

Preferably the nesting configuration of the trays may be controlled by choosing the position and size of the openings and the projections, and/or the height of the skirt around the perimeter of the tray. By locating the projections near the tray top, and by extending the openings to the lower end of each projection, the trays may be made to nest more deeply in one another.

The cell diameters may be selected to correspond to the diameter of the stabilised media to be received in the cell. Popular cylindrical stabilised media such as Ellepots® are made in diameters ranging from 15 mm to 120 mm.

The upper cell diameter and the lower cell diameter defined by the first and second projections, respectively, may be substantially equal to the diameter of the stabilised media. However, the upper and lower cell diameters may be greater than, or even less than, the diameter of the stabilised media to be received. If the upper or lower cell diameter is less than the diameter of the stabilised media to be received, the stabilised media will be "squeezed" by the projections. This may advantageously mean that the stabilised media are held firmly in position.

Preferably the upper cell diameter and/or lower cell diameters are approximately equal to the diameter of the stabilised medium, within a variance of 10% of the diameter of the stabilised medium.

In a preferred embodiment, the upper cell diameter is equivalent to the diameter of the stabilised medium, while the lower cell diameter is 5% smaller than the diameter of the stabilised medium. This means that the stabilised medium is squeezed tightly at its base by the second projections, and supported in position less tightly by the first projections.

DESCRIPTION OF SPECIFIC EMBODIMENTS AND BEST MODE OF THE INVENTION

Specific embodiments of the invention will be now be described by way of example, with reference to the accompanying drawings in which.

Figure 1:
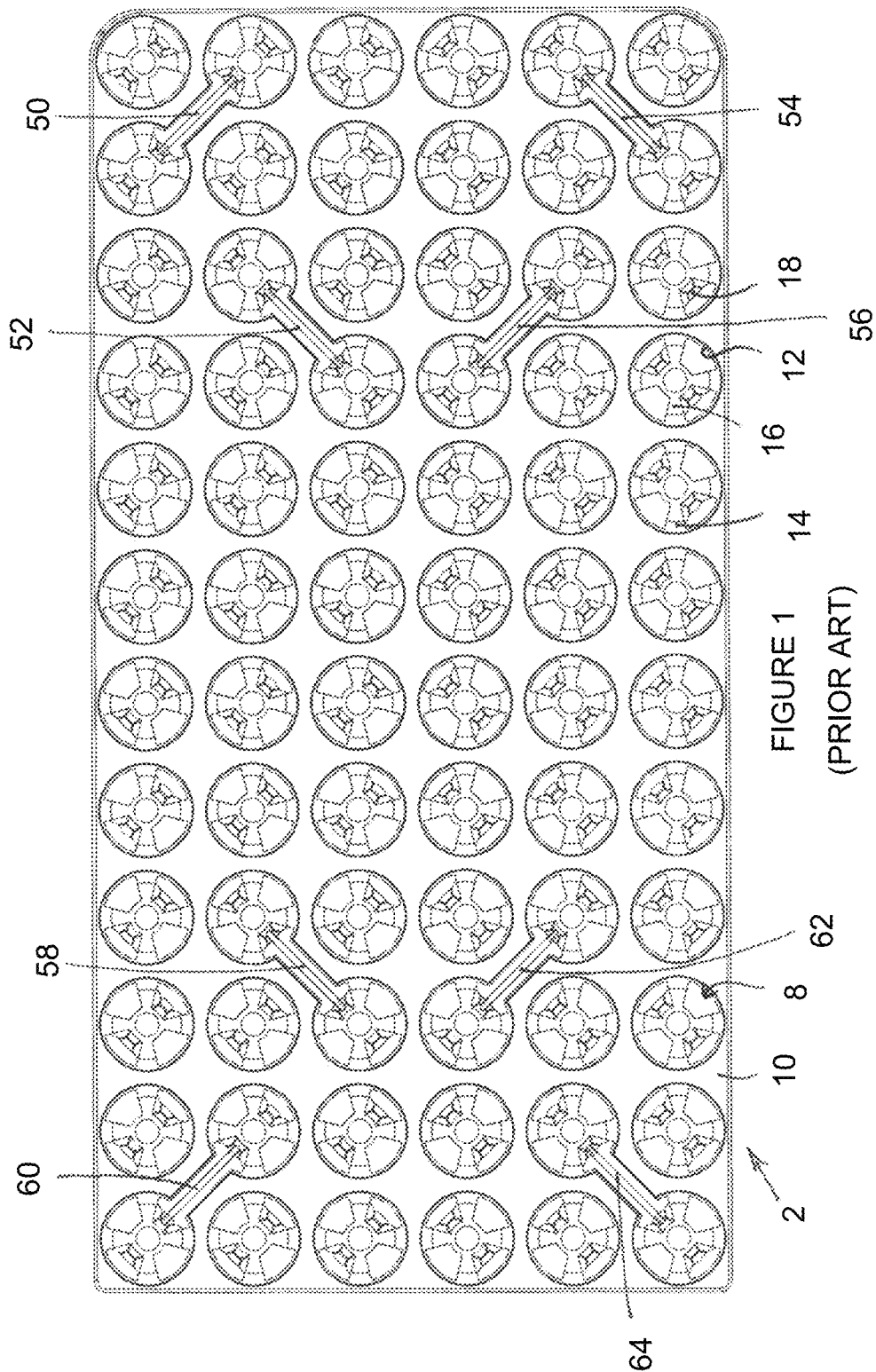
FIG. 1 is a plan view of a plant tray according to the prior art.
Figure 2:
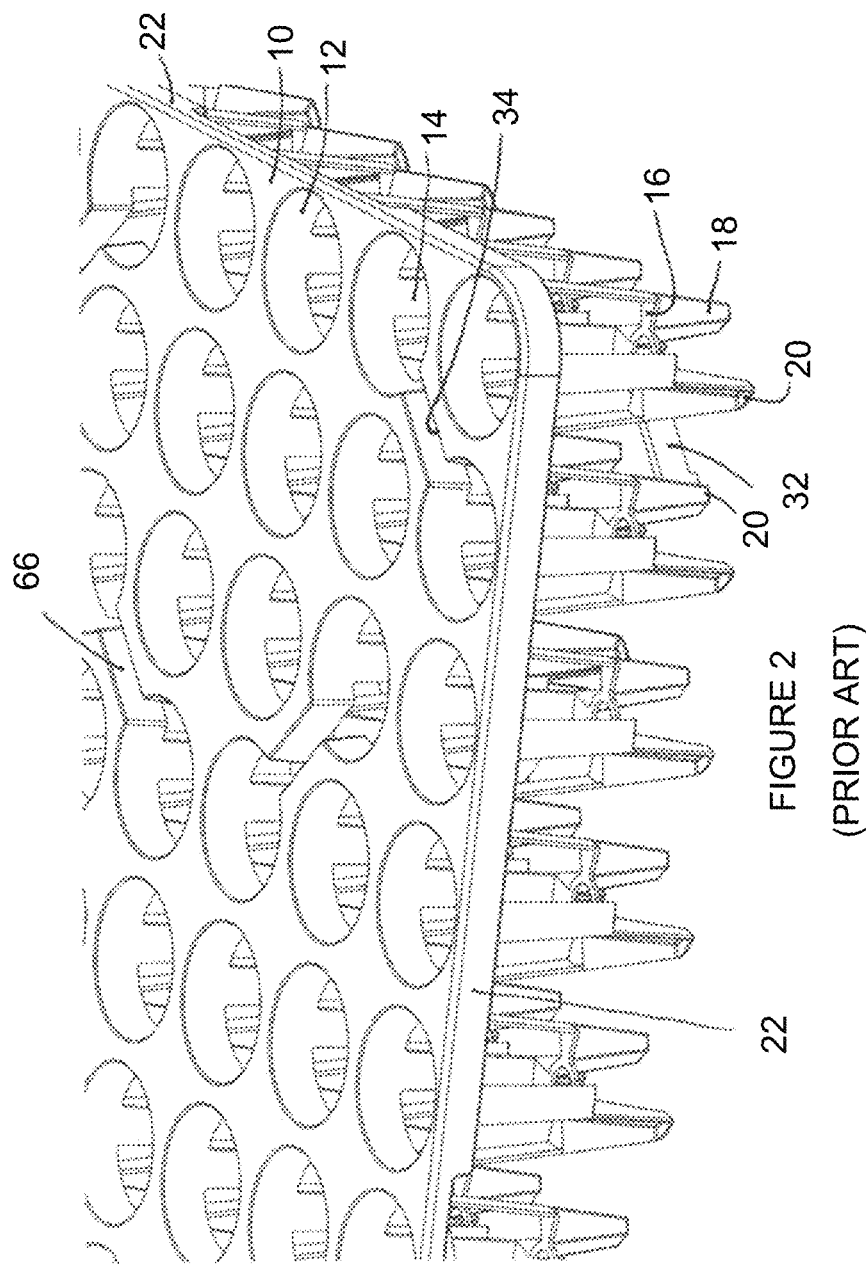
FIG. 2 is a partial perspective view, from above, of the front, right-hand corner of the prior art tray of FIG. 1.

FIGS. 1 and 2 illustrate a prior art plant tray 2, as described in WO2010/103276. The prior art tray comprises a square, 6 by 12, array of cells 8. Each cell extends downwardly from a circular opening defined in a substantially flat upper surface 10 of the tray. Each cell tapers inwardly from the circular opening to a lower end of the cell. An upper end of each cell is formed by a tapered flange 12 extending downwardly from the upper surface 10. Four ribs 14 extend downwardly from the flange to a horizontal, generally cruciform base 16 linking the four ribs 14.

The flange, the ribs and the base define a container, or cell, for receiving compost. In this case, the container or cell is suitable for receiving a stabilised medium, which may be a soilholder of compost or a separate container of compost. Cells for containing loose compost directly would require more extensive, or complete, walls.

Due to the tapered ribs 14 of the cells, which are required for the tray 2 to nest, when a cylindrical stabilised medium is inserted into the tray 2, the stabilised medium is free to move around in the cell. In particular, the stabilised medium may tip over, or overbalance, out of its intended upright position.

As can be seen in FIG. 1, the prior art tray comprises eight stacking apparatuses 50, 52, 54, 56, 58, 60, 62, 64.

Each stacking apparatus comprises a beam 32 linking the adjacent foot portions of two adjacent, diagonally-separated cells. The beam is therefore at 45° to an edge of the rectangular tray. Above the beam, a slot or opening 34 is defined through the upper surface 10 of the tray. The slot or opening links the cells that are bridged by the beam, and extends down the sides of the cells to allow nesting of a beam of a similar tray.

Thus, when two similar trays are placed on top of one another, the tapered cells of the upper tray nest within the tapered cells of the lower tray, and the beams 32 of the upper tray pass through the slots or openings 34 of the lower frame, such that the frames nest. Since the beam of each stacking apparatus is positioned close to the foot portions of the cells, the stacking apparatus do not obstruct nesting to the full depth of the cells, such that when two trays are nested, the skirt 22 surrounding the rim of the upper tray can rest on the upper surface of the lower tray.

In order to stack the prior art tray on a similar tray, the tray must be rotated through 180° relative to the similar tray. In this orientation, the beam of each stacking apparatus is perpendicular to the opening or slot of the stacking apparatus in the tray beneath. The beam will therefore not pass through the opening or slot, but instead will seat on the upper surface of the lower tray, bridging the opening or slot. Thus, the upper tray stacks on the lower tray, supported by the abutment of the lower edges of the beams of the stacking apparatus with the upper surface of the lower tray.

Figure 3:
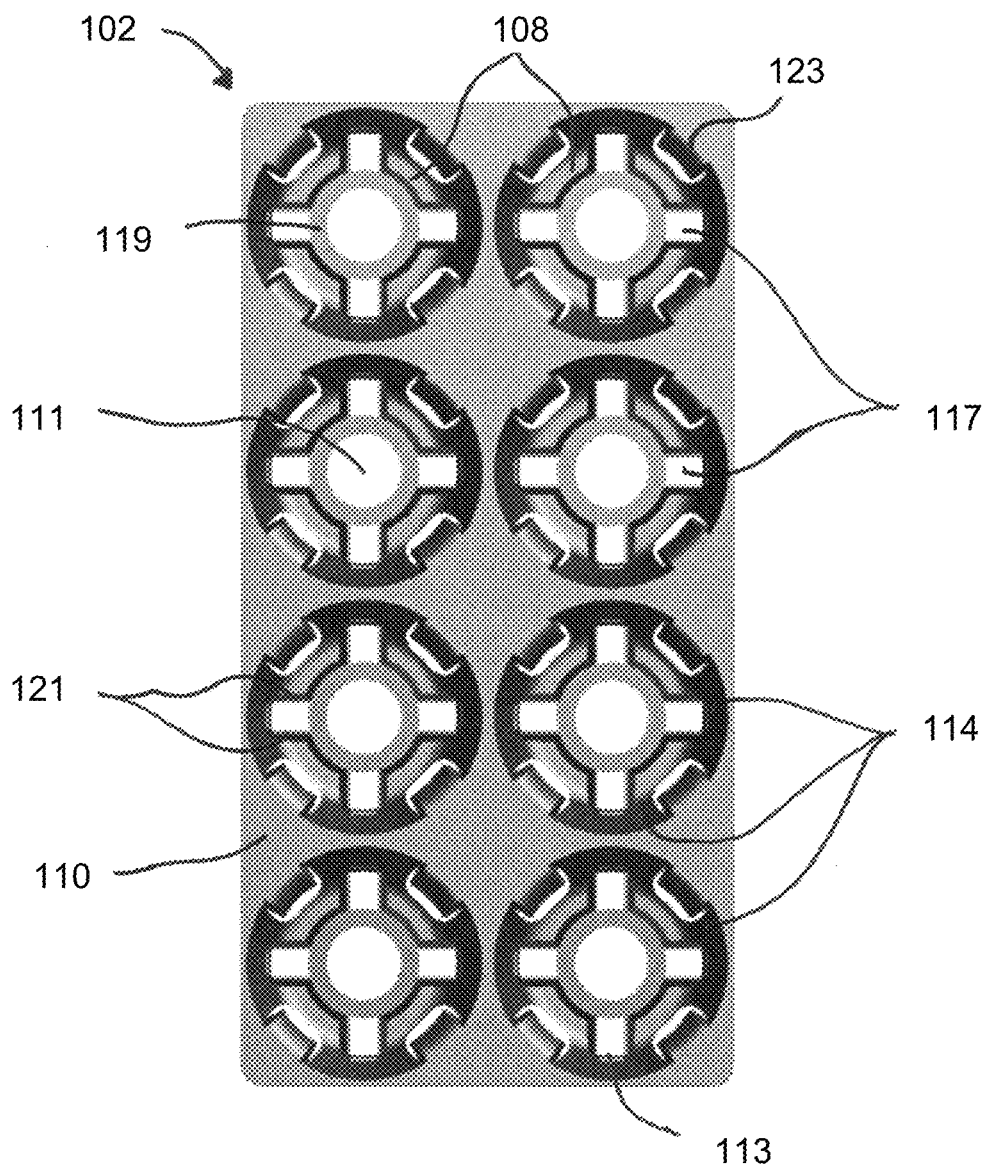
FIG. 3 is a plan view of a plant tray according to a first embodiment of the invention.
Figure 4:
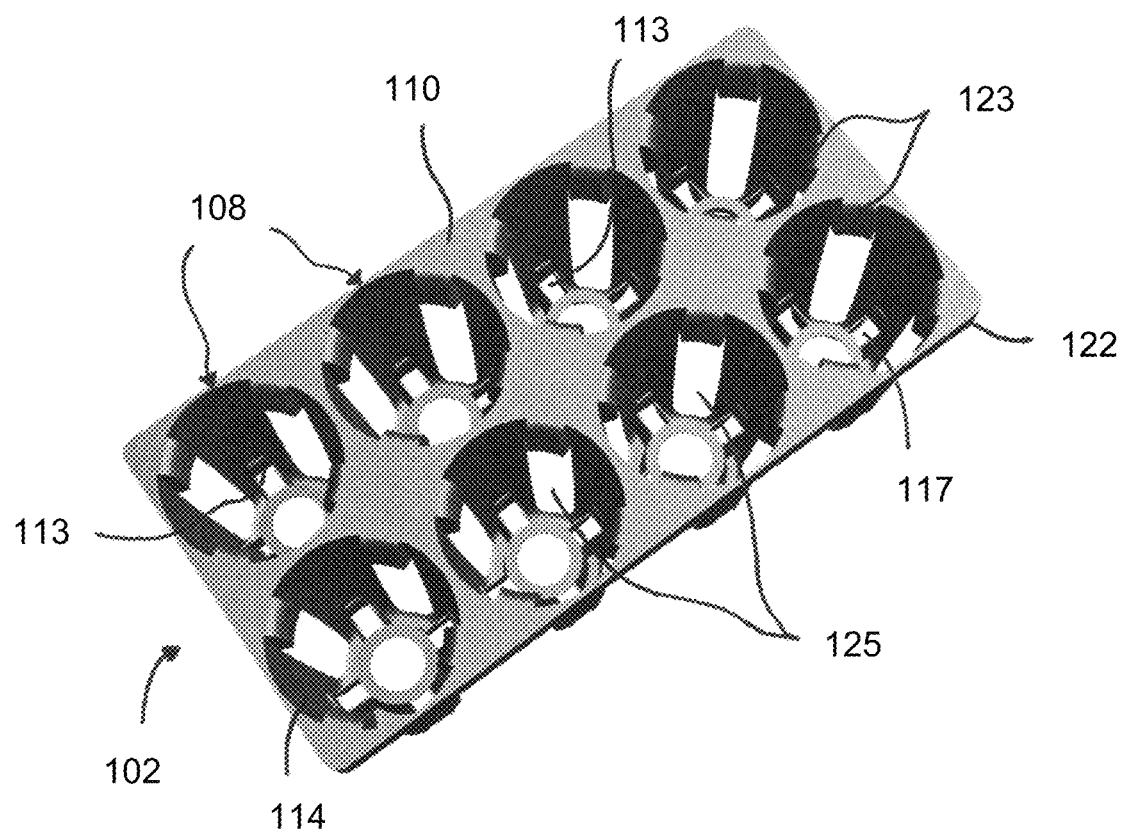
FIG. 4 is a perspective view, from above, of the tray of FIG. 3.
Figure 5:
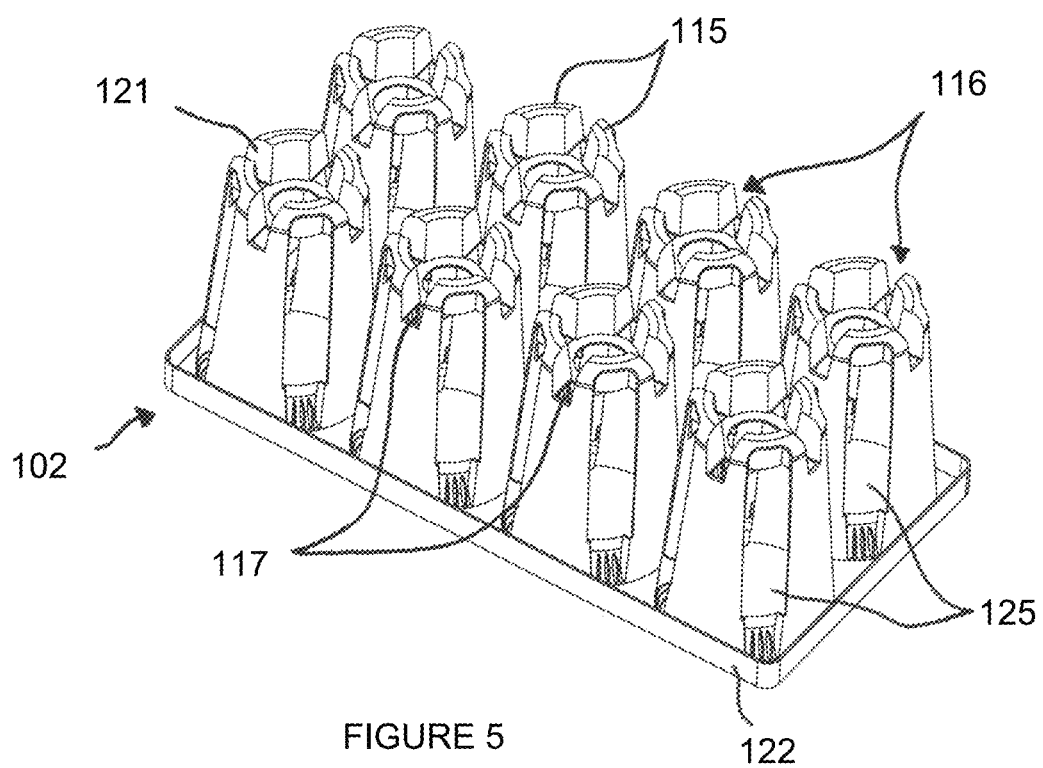
FIG. 5 is a perspective view of the underside of the plant tray in FIGS. 3 and 4.

FIGS. 3, 4 and 5 show a plant tray 102 according to a first embodiment of the present invention. The plant tray 102 comprises a square, 2 by 4, array of cells 108. Each cell extends downwardly from a generally circular mouth defined in a substantially flat upper surface 110 of the tray. Each cell tapers inwardly from the circular mouth to a lower end of the cell. Four side walls 114 extend downwardly from the upper surface 110 to a cell base 116.

A raised central platform 119 is formed in the cell above the level of the cell base 116. A circular base hole 111 is formed through the centre of the raised central platform 119, to allow for automated ejection of plants from the cells. The central platform 119 is connected to the four side walls 114 by four pairs of vent walls 121, each pair of vent walls extending between the platform and the side walls at the height of the central platform. An aperture is formed between each pair of vent walls 121, so as to form a raised vent 117 through which the cell interior is exposed to the surroundings. Each side wall 114 is divided into two prongs by the raised vents. Each prong of the side walls 114 are connected to the vent walls 121 and extend downwardly around the raised vents. The two prongs of the side walls, and the vent walls 121, extend below the level of the raised vents to the cell base 116. The cell base is formed from four curved cell feet 115, arranged around the perimeter of the cell between adjacent vent walls 121.

A lower projection 113 is formed on each side wall above each raised vent 117. The lower projections 113 project into the cell from the side walls, so that a "lower cell diameter" is defined as the distance across the cell between opposing lower projections 113.

In the preferred embodiment shown in FIGS. 3 to 5, the lower cell diameter is 100 mm, which corresponds to a preferred diameter of Ellepot® stabilised media.

Four curved upper projections 123 are formed between the side walls 114 at the upper surface 110 of the tray 102. The upper projections 123 each have a curved upper surface which tapers inwardly and downwardly into the cell, and the sides of the upper projections are connected to the side walls 114 on either side. An "upper cell diameter" is defined as the distance across the cell between opposing upper projections 123.

In the preferred embodiment shown in FIGS. 3 to 5, the upper cell diameter is 100 mm, which corresponds to a preferred diameter of Ellepot® stabilised media, and matches the lower cell diameter formed by the lower projections.

Openings 125 separate adjacent side walls 114. The openings 125 extend along the height of the cell between the sides of the upper projections 123 and the cell feet 115, so that the openings are positioned below the upper projections. The width of the openings 125 is uniform along the length of the cell, to allow nesting with the upper projections of a similar tray.

The relative positions and sizes of the upper projections 123 and the openings 125 may be chosen to determine the depth at which the tray 102 can nest with a similar tray.

As shown in FIG. 5, the underside of the upper projections 123 are strengthened by buttresses to improve rigidity and increase the lifespan of the tray 102. Both the buttresses and the underside of the upper projections 123 are tapered, and the sides of the projections are flared outwards to allow a similar projection to nest underneath the upper projection.

The side walls 114 and the cell base 116 define a container, or cell, for receiving compost. In this case, the container or cell is particularly suitable for receiving a stabilised medium, which may be a soilholder of compost or a separate container of compost. Cells for containing loose compost directly would require more extensive, or complete, walls.

A peripheral skirt 122 extends downwardly from the substantially rectangular edge of the rim of the upper surface 110 of the tray.

In use, suitable stabilised media such as Ellepots® may be held in the plant tray 102. Suitable stabilised media are preferably parallel-sided cylindrical, or tubular, stabilised media, and are preferably selected to have a diameter which corresponds to the upper and lower cell diameters of the tray 102. The length of the stabilised media preferably corresponds to the distance between the raised central platform 119 and the upper surface 110 of the tray 102.

A single, parallel-sided stabilised medium (not shown) may be inserted into each cell 108, until the base of the stabilised medium abuts the raised central platform 119 and the vent walls 121, at which point the stabilised medium is in a fully inserted position. The lower cell diameter defined by the lower projections 113 is configured to be equivalent, or very nearly equivalent, to the outer diameter of a suitable stabilised medium, so the lower end of the stabilised medium is contacted and supported in position by the lower projections 113 and the cell base. The upper cell diameter defined by the upper projections 123 is also configured to be equivalent, or very nearly equivalent, to the outer diameter of a suitable stabilised medium, so the upper end of the stabilised medium is contacted and supported in the centre of the cell by the upper projections 123.

By supporting the stabilised media at two points along their length, the upper and lower projections 123, 113, advantageously retain the stabilised media in their intended upright position in the centre of the cells 108. Unlike in the prior art tray of FIGS. 1 and 2, the stabilised media will be unable to tip over, or overbalance, in the cells 108 of the present invention. This allow plants to grow straight up out of the stabilised media, as intended, and is particularly beneficial where automated processes are involved in plant propagation, as the stabilised media are always maintained in their intended positions.

The projections also support the stabilised media away from the side walls 114 of the cell. This may advantageously allow uniform airflow to the sides of the stabilised media, to encourage air pruning.

The raised platform 119 and the vent walls 121 advantageously support the stabilised media off the ground, to prevent roots growing into the ground, in use, and the vents allow airflow to the base of the stabilised media for air pruning.

The four curved cell feet 115 advantageously spreads the weight of the tray 102, loaded with watered stabilised media, and latterly plants, over a larger contact area with the ground than was possible with the prior art tray of FIGS. 1 and 2. This helps to prevent the tray 102 from sinking into the ground, in use.

Before stabilised media are inserted into the cells 108, or between uses, a plurality of trays 102 may be nested with one another, so that they occupy less space for storage or transport.

The openings 125 below the upper projections 123 allow the tray 102 to be nested with a similar tray. The openings are slightly wider than the upper projections, and extend along the height of the cells 108, so that the upper projections 123 of a lower tray may pass through, or nest in, the openings 125 of an upper tray. This feature allows the use of upper projections to support the stabilised media in place, while also allowing the trays to be nested closely for spacial efficiency.

FIGS. 6 to 12 show a plant tray 202 according to a second embodiment of the present invention. The plant tray 202 comprises a square, 8 by 16, array of cells 208. Each cell extends downwardly from a generally circular mouth defined in a substantially flat upper surface 210 of the tray. Each cell tapers inwardly from the circular mouth to a lower end of the cell. Four side walls 214 extend downwardly from the upper surface 210 to a cell base 216.

The cell base 216 is generally flat, except for a raised central platform 219 formed on the cell base 216. A circular base hole 211 is formed through the centre of the raised central platform 219, to allow for automated ejection of plants from the cells. The raised central platform also creates rigidity and strength in the base of the cell, and may help to retain compost in the base of the stabilised medium.

A vertical rib 213 projects inwardly from each side wall, and extends from the cell base up approximately one third of the cell's height. The vertical ribs 213 project into the cell from the side walls, so that a "lower cell diameter" is defined as the distance across the cell between opposing vertical ribs 213.

In the preferred embodiment shown in FIGS. 6 to 12, the lower cell diameter is 25 mm, which corresponds to a preferred diameter of Ellepot® stabilised media.

Four curved upper ribs 223 are formed between the side walls 214 in the upper half of the cells. The upper ribs 223 each have a curved upper surface which projects into the cell, and the sides of the upper ribs are connected to the side walls 214 on either side. An "upper cell diameter" is defined as the distance across the cell between opposing upper ribs 223.

In the preferred embodiment shown in FIGS. 6 to 12, the upper cell diameter is 25 mm, and the lower cell diameter formed by the lower ribs is 25 mm, which corresponds to a preferred diameter of Ellepot® stabilised media. The tray of FIGS. 6 to 12 is thus configured to receive cylindrical stabilised media with a diameter of 25 mm.

Openings 225 separate adjacent side walls 114. The openings 125 extend up approximately half the height of the cell between the sides of the upper ribs 223 and the cell base 216, so that the openings are positioned below the upper ribs. The width of the openings 225 is wider than the upper ribs, to allow nesting with the upper ribs of a similar tray.

The upper ribs are radially offset relative to the lower ribs by 45 degrees. This allows the openings 225 to be formed beneath the upper ribs 223 and between the lower ribs 213, so that the tray 202 can nest with a similar tray.

The undersides of the upper ribs 223 are hollow and tapered to allow a similar rib to nest underneath, or outside, the upper rib.

The side walls 214 and the cell base 216 define a container, or cell, for receiving compost. In this case, the container or cell is particularly suitable for receiving a stabilised medium, which may be a soilholder of compost or a separate container of compost. Cells for containing loose compost directly would require more extensive, or complete, walls.

A peripheral skirt 222 extends downwardly from the substantially rectangular edge of the rim of the upper surface 210 of the tray.

Figure 6:
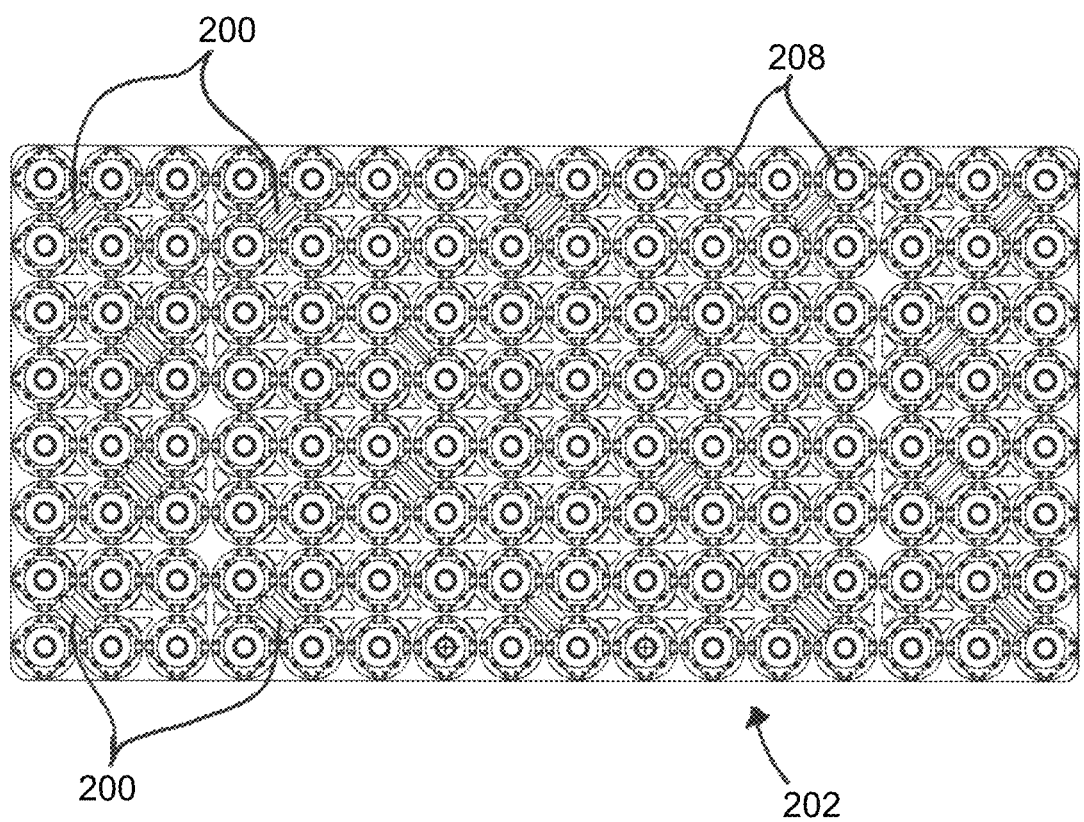
FIG. 6 is a plan view of a plant tray according to a second embodiment of the invention.
Figure 7:
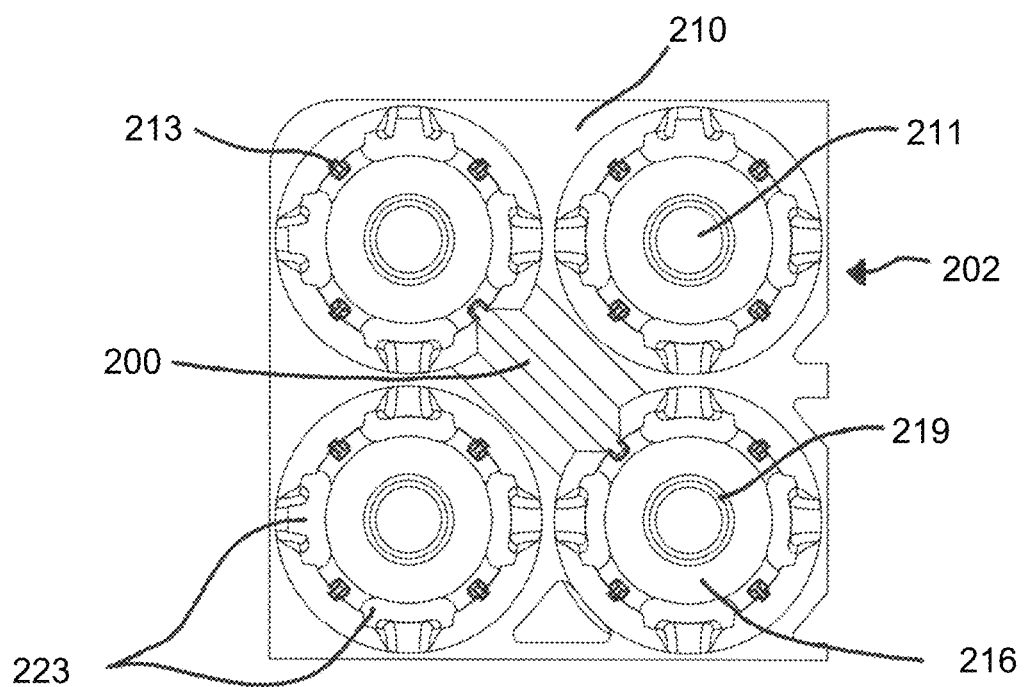
FIG. 7 is an enlarged partial plan view of a portion of the plant tray of FIG. 6.
Figure 8:
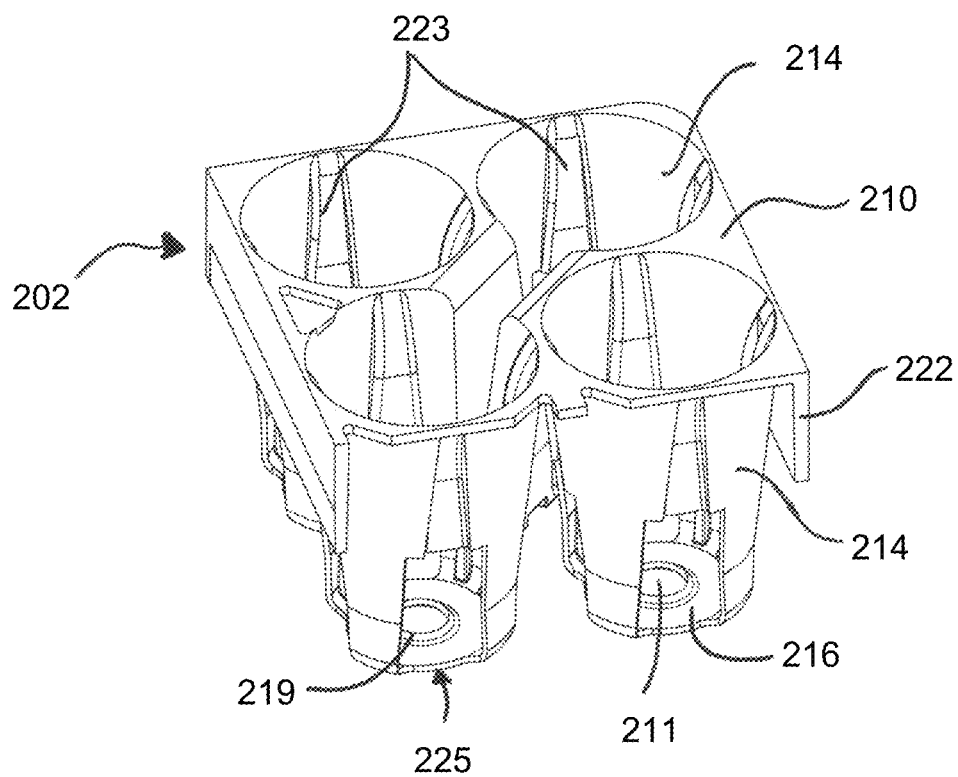
FIG. 8 is a perspective view, from above, of the portion of the plant tray shown in FIG. 7.
Figure 9:
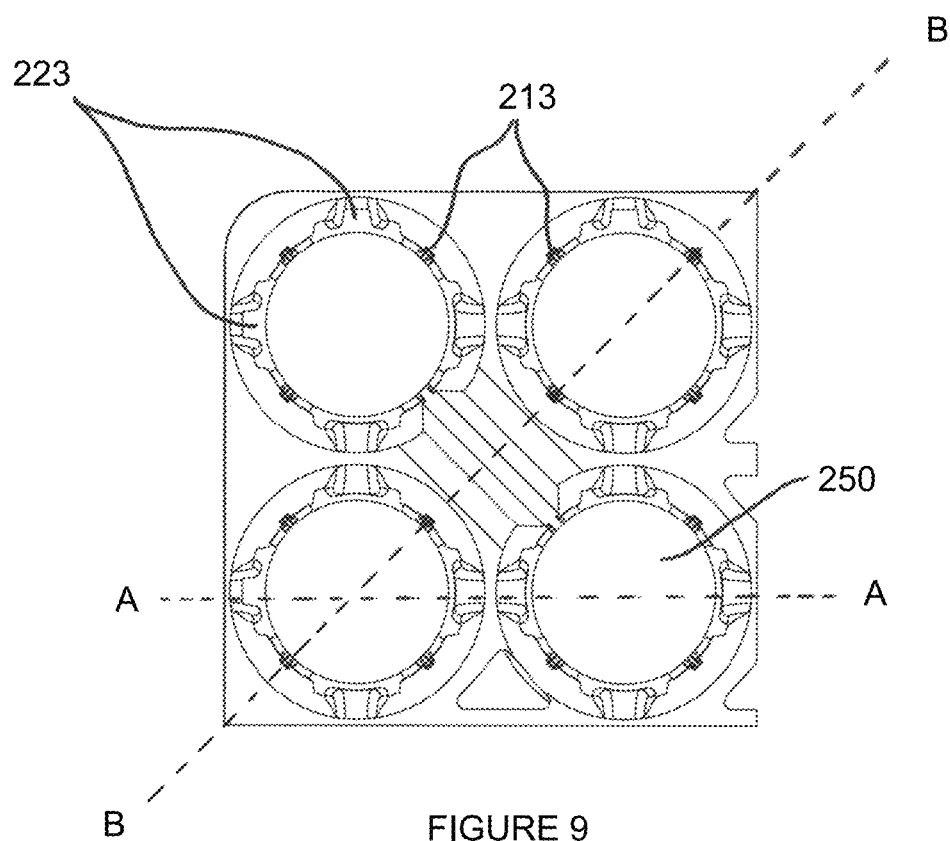
FIG. 9 is an enlarged partial plan view of the portion of the plant tray shown in FIGS. 7 and 8, containing a stabilised medium.
Figure 10:
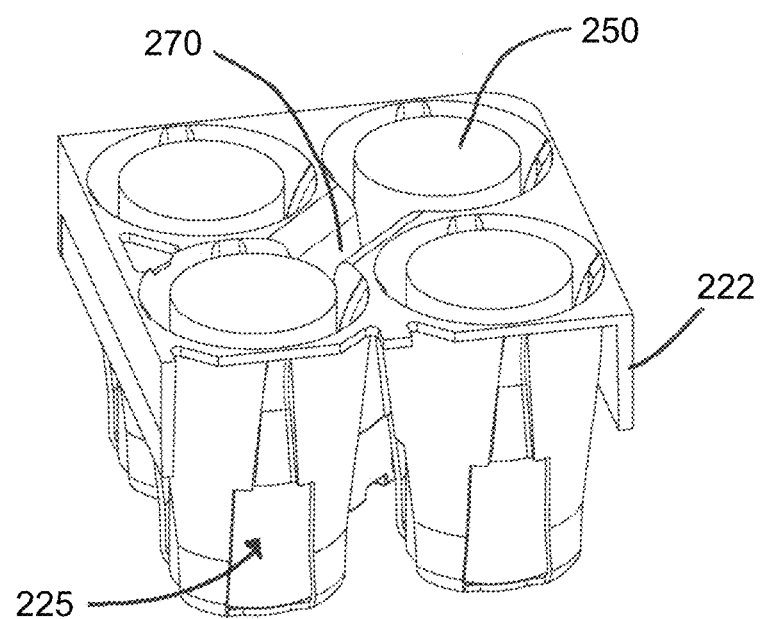
FIG. 10 is a perspective view, from above, of the portion of the plant tray shown in FIGS. 7 to 9, containing a stabilised medium.
Figure 11:
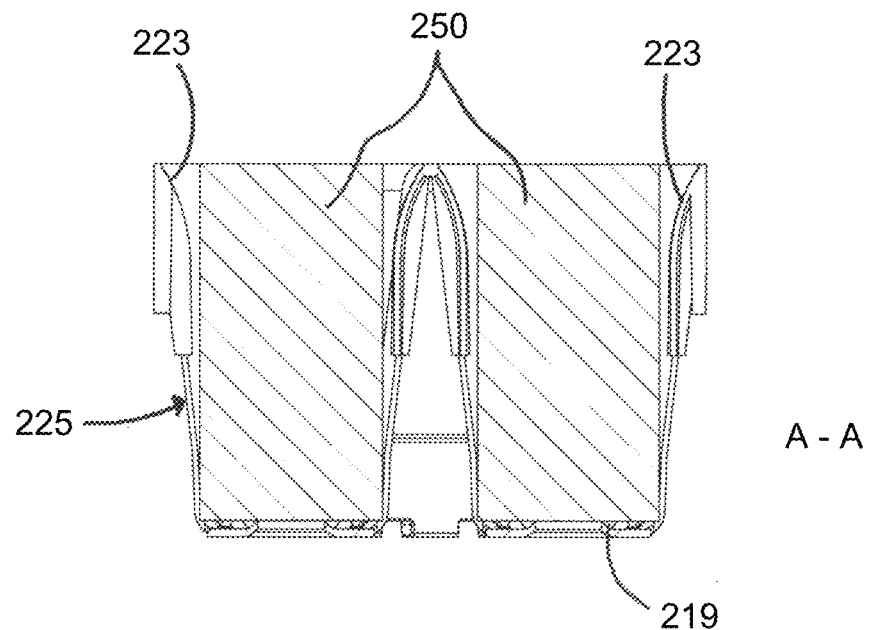
FIG. 11 is a vertical cross-section of the portion of the plant tray shown in FIGS. 9 and 10 taken along the line A-A.
Figure 12:
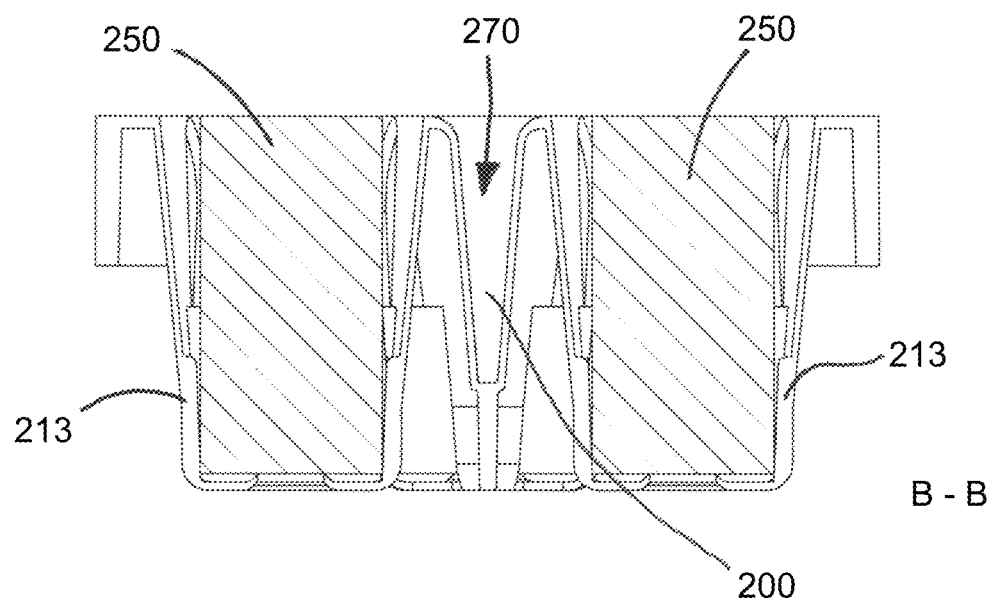
FIG. 12 is a vertical cross-section of the portion of the plant tray shown in FIGS. 9 and 10 taken along the line B-B.

As can be seen in FIG. 6, the tray comprises a plurality of stacking apparatuses 200. These stacking apparatuses function in a similar way to those described above in relation to the prior art tray of FIGS. 1 and 2.

Each stacking apparatus 200 comprises a beam 260 linking the adjacent lower ribs 213 portions of two adjacent, diagonally-separated cells. The beam is therefore at 45° to an edge of the rectangular tray. Above the beam, a slot or opening 270 is defined through the upper surface 210 of the tray. The sides of the slot 270 are connected to the beam 260. The slot or opening links the cells that are bridged by the beam, and extends down the sides of the cells to allow nesting of a beam of a similar tray.

Thus, when two similar trays are placed on top of one another, the tapered cells of the upper tray nest within the tapered cells of the lower tray, and the beams 260 of the upper tray pass through the slots or openings 270 of the lower tray, such that the trays nest. Since the beam of each stacking apparatus is positioned close to the foot portions of the cells, the stacking apparatus do not obstruct nesting to the full depth of the cells, such that when two trays are nested, the skirt 222 surrounding the rim of the upper tray can rest on the upper surface of the lower tray.

In order to stack the prior art tray on a similar tray, the tray must be rotated through 180° relative to the similar tray. In this orientation, the beam of each stacking apparatus is perpendicular to the opening or slot of the stacking apparatus in the tray beneath. The beam will therefore not pass through the opening or slot, but instead will seat on the upper surface of the lower tray, bridging the opening or slot. Thus, the upper tray stacks on the lower tray, supported by the abutment of the lower edges of the beams of the stacking apparatus with the upper surface of the lower tray.

In use, suitable stabilised media such as Ellepots® may be held in the plant tray 202. Suitable stabilised media are preferably parallel-sided cylindrical, or tubular, stabilised media, and are preferably selected to have a diameter which corresponds to the upper and lower cell diameters of the tray 202. The length of the stabilised media preferably corresponds to the distance between the cell base 216 and the upper surface 210 of the tray 202.

As shown in FIGS. 9 to 12, a single parallel-sided stabilised medium 250, which has an outer diameter of 25 mm, may be inserted into each cell 208, until the base of the stabilised medium abuts the raised central platform 219, at which point the stabilised medium is in a fully inserted position. The lower cell diameter defined by the lower ribs 213 is configured to be 25 mm, so that it is equivalent to the outer diameter of the stabilised medium. Thus, when inserted into the cell, the lower end of the stabilised medium is contacted and supported in position by the lower ribs 213. The upper cell diameter defined by the upper ribs 223 is also configured to be 25 mm, so that it is equivalent to the outer diameter of the stabilised medium. This means that the upper end of the stabilised medium is contacted and supported in position by the upper ribs 223.

By supporting the stabilised media at two points along their length, the upper and lower ribs 223, 213, advantageously retain the stabilised media in their intended upright position in the centre of the cells 208. Unlike in the prior art tray of FIGS. 1 and 2, the stabilised media will be unable to tip over, or overbalance, in the cells 208 of the present invention. This allows plants to grow straight up out of the stabilised media, as intended, and is particularly beneficial where automated processes are involved in plant propagation, as the stabilised media are always maintained in their intended positions. This has not previously been possible in nesting trays with tapered cells, and so provides the distinct advantage of providing this function in a tray that can be nested to save space for storage and transport.

The ribs also support the stabilised media away from the side walls 214 of the cell. This may advantageously allow uniform airflow to the sides of the stabilised media, to encourage air pruning, as well as excellent drainage and aeration.

The raised platform 219 advantageously supports the stabilised media off the ground, to prevent roots growing into the ground, in use, and the vents allow airflow to the base of the stabilised media for air pruning.

The flat cell base 216 advantageously spreads the weight of the tray 202, loaded with watered stabilised media, and latterly plants, over a larger contact area with the ground than was possible with the prior art tray of FIGS. 1 and 2. This helps to prevent the tray 202 from sinking into the ground, in use.

Before stabilised media are inserted into the cells 208, or between uses, a plurality of trays 202 may be nested with one another, so that they occupy less space for storage or transport. The trays may also be stacked thanks to the stacking apparatuses 200.

The openings 225 below the upper ribs 223 allow the tray 202 to be nested with a similar tray. The openings are slightly wider than the upper ribs, so that the upper ribs 223 of a lower tray may pass through, or nest in, the openings 225 of an upper tray. This feature allows the use of upper projections to support the stabilised media in place, while also allowing the trays to be nested closely for spacial efficiency.

All of the cells shown in FIGS. 3 to 12 may be made in different sizes, to suit stabilised media of different dimensions.

Figure 13A:
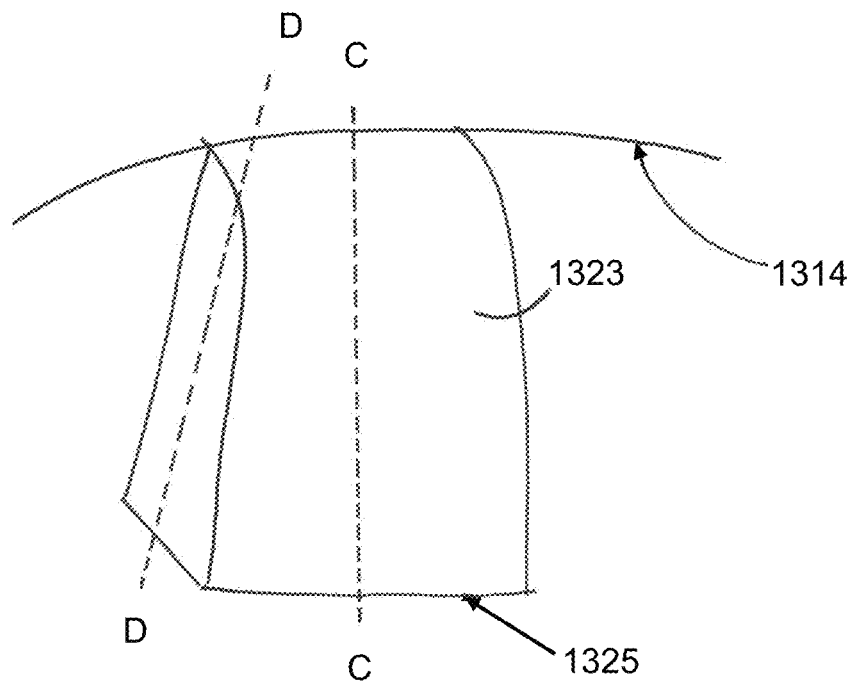
FIGS. 13A, 13B and 13C illustrate a nestable upper projection according to a preferred embodiment of the present invention.
Figure 13B:
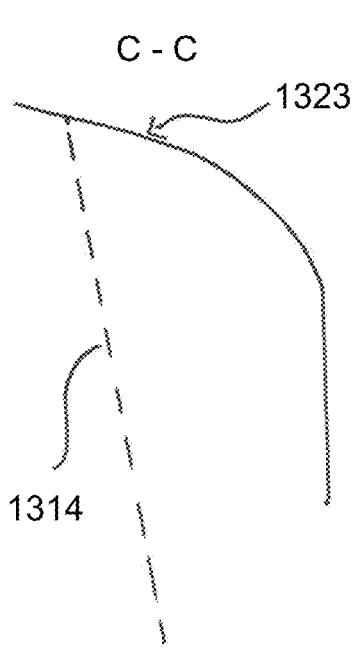
Figure 13C:
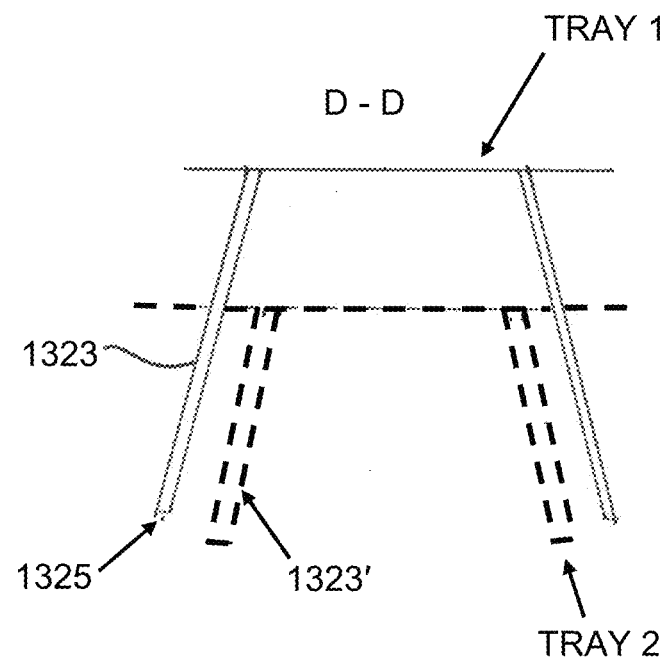

FIGS. 13A, 13B and 13C schematically illustrate a nestable upper projection of a tray (Tray 1) according to a preferred embodiment of the present invention. FIG. 13A shows an upper projection 1323 projecting from a side wall 1314 of a cell. FIG. 13B shows a side-on vertical cross-section of upper projection 1323 taken along the line C-C. FIG. 13C shows a straight-on vertical cross-section of upper projection 1323 taken along the line D-D, with an identical second tray, labelled Tray 2, in a nesting orientation below the Tray 1.

As shown in FIG. 13B, the opening in the side wall 1314 (side wall 1314 is indicated in dotted lines as cross-section C-C is taken through the opening) extends up into, and behind, the upper projection 1323. The upper projection 1323 has a hollow underside, so that a similar projection 1323' of Tray 2 (shown in dotted lines in FIG. 13C) can nest beneath, and inside, the upper projection 1323 of Tray 1. The peripheral sides of the projection also widen, or flare outwards, towards its lower end 1325, to allow a similar projection 1323' of Tray 2 to nest beneath, and inside, the upper projection 1323 of Tray 1. These features of the upper projection 1323 advantageously allow similar trays to nest together more closely than would otherwise be the case, improving the spacial efficiency of the trays for storage and transport.

The invention claimed is:

1. A plant-growing tray comprising one or more cells for containing cylindrical stabilised media for propagating plants, in which the tray comprises a tray top, and the or each cell comprises a base and an inclined side wall extending from the base to the tray top, the or each cell being configured to receive a cylindrical stabilised medium and comprising:
    a plurality of projections, positioned around the side wall and facing into the cell, in which the plurality of projections are located in an upper half of the cell and are configured in use to support an upper portion of the cylindrical stabilised medium; and a plurality of openings defined in the side wall beneath the projections, in which each of the projections is arranged above an opening in the side wall.

2. A plant-growing tray according to claim 1, in which the openings are configured so that the tray may be nested with a second tray, wherein the tray can adopt a nesting orientation in which the projections pass through, or nest in, the corresponding openings defined in the cell side walls of the second tray.

3. A plant-growing tray according to claim 1, in which the or each cell comprises 3, or 4, or 5, or 6, or 8, projections configured in use to support an upper portion of the stabilised medium.

4. A plant-growing tray according to claim 1, in which the projections define an upper cell diameter, configured to receive an upper portion of the cylindrical stabilised medium, and a cell base diameter is defined where the cell base meets the side wall, the cell base diameter being configured to receive a lower portion of the cylindrical stabilised medium, in which the upper cell diameter is approximately equal to the cell base diameter.

5. A plant-growing tray according to claim 4, in which the side wall of the cell defines a side wall diameter where the side wall meets the tray top, and in which the upper cell diameter is greater than or equal to 4 mm, or 8 mm, or 12 mm, or 15 mm, or 20 mm, or 25 mm, or 30 mm, or 35 mm, or 40 mm less than the side wall diameter.

6. A plant-growing tray according to claim 1, in which each of the projections comprises a rounded upper surface.

7. A plant-growing tray according to claim 1, in which the projections are first projections, and the tray additionally comprises a plurality of second projections, positioned around the side wall between the openings and facing into the cell, configured in use to support a lower portion of the cylindrical stabilised medium.

8. A plant-growing tray according to claim 7, in which the first projections are radially offset relative to the second projections by 22.5°, or 30°, or 36°, or 45°, or 60°.

9. A plant-growing tray according to claim 7, in which each cell comprises 3, or 4, or 5, or 6, or 8, first projections, and 3, or 4, or 5, or 6, or 8, second projections.

10. A plant-growing tray according to claim 7, in which the first projections define an upper cell diameter, configured to receive an upper portion of the cylindrical stabilised medium, and the second projections define a lower cell diameter configured to receive a lower portion of the cylindrical stabilised medium.

11. A plant-growing tray according to claim 10, in which the upper cell diameter is approximately equal to the lower cell diameter.

12. A plant-growing tray according to claim 1, in which the tray is configured to be stacked or nested with a second tray, in which the tray comprises
    a stacking apparatus comprising a stacking abutment spaced beneath an upper surface of the tray, and a corresponding opening defined in the upper surface of the tray above the stacking abutment, such that in a stacking orientation of the tray the stacking abutment seats on a seat portion of the second tray, and in a nesting orientation of the tray the stacking abutment passes through, or nests in, the corresponding opening defined in the upper surface of the second tray.

13. A plant-growing tray according to claim 12, in which the tray comprises an upper surface which is substantially parallel to the upper surface of the second tray both when the tray and the second tray are nested and when they are stacked, and the tray is rotatable and/or translatable between the nesting and stacking orientations.

14. A plant-growing tray according to claim 1, in which the base of each cell comprises a central base hole.

15. A plant-growing tray according to claim 1, in which the base of each cell comprises a raised portion projecting upwardly from the base, the raised portion being configured to support a base of the cylindrical stabilised media.

16. A plant-growing tray according to claim 1, in which the tray comprises an array of 8 cells, or 8, 15, 18, 32, 72, 98, 128, 126, 162, or 200 cells.

17. A plant-growing tray according to claim 1, in which the tray is formed from injection-moulded plastic.

18. A plant-growing tray according to claim 1, in which the openings extend to a lower end of the projections, and in which the projections comprise a tapered or hollow underside configured to receive the projection of a second tray when the trays are in a nesting orientation.

19. A plant-growing tray according to claim 1, in which the base of the cell is configured to contact 5-35% of the surface area of the base of the stabilised medium, in use.

20. A plant-growing tray according to claim 1, in which the base of each cell is configured so that 15-70% of the cell base projected area is in contact with the ground, in use.

21. A plant-growing tray according to claim 1, in which the projections define an upper cell diameter, configured to receive an upper portion of the cylindrical stabilised medium, and a cell base diameter is defined where the cell base meets the side wall, the cell base diameter being configured to receive a lower portion of the cylindrical stabilised medium, in which the upper cell diameter is up to 2%, or 5%, or 8%, or 10% larger than the cell base diameter.

* * * * *